(12) United States Patent
Winkler

(10) Patent No.: US 11,383,927 B2
(45) Date of Patent: Jul. 12, 2022

(54) SHIPPING BUFFER FOR AN ORDER-PICKING SYSTEM

(71) Applicant: Witron Logistik + Informatik GmbH, Parkstein (DE)

(72) Inventor: Walter Winkler, Parkstein (DE)

(73) Assignee: Witron Logistik + Informatik GmbH, Parkstein (DE)

( * ) Notice: Subject to any disclaimer, the term of this patent is extended or adjusted under 35 U.S.C. 154(b) by 0 days.

(21) Appl. No.: 16/612,860

(22) PCT Filed: May 11, 2018

(86) PCT No.: PCT/EP2018/062264
§ 371 (c)(1),
(2) Date: Nov. 12, 2019

(87) PCT Pub. No.: WO2018/206801
PCT Pub. Date: Nov. 15, 2018

(65) Prior Publication Data
US 2020/0198893 A1 Jun. 25, 2020

(30) Foreign Application Priority Data
May 12, 2017 (DE) .......................... 102017110373.2

(51) Int. Cl.
*B65G 1/137* (2006.01)
*F24F 11/80* (2018.01)
(Continued)

(52) U.S. Cl.
CPC ........... *B65G 1/1373* (2013.01); *B65G 1/023* (2013.01); *B65G 1/0407* (2013.01);
(Continued)

(58) Field of Classification Search
CPC .... B65G 1/1373; B65G 1/023; B65G 1/0407; B65G 1/0435; B65G 1/0635; B65G 1/065;
(Continued)

(56) References Cited

U.S. PATENT DOCUMENTS 3,982,639 A 9/1976 Haldimann et al.
4,582,188 A * 4/1986 Seiz ..................... B65G 13/075
188/195

(Continued)

FOREIGN PATENT DOCUMENTS

DE 3037634 A1 5/1982
DE 3702248 A1 8/1987
(Continued)

OTHER PUBLICATIONS

German language with English translation of the International Preliminary Report on Patentability and Written Opinion of corresponding PCT/EP2018/062264, dated Nov. 12, 2019 (28 pages).
(Continued)

*Primary Examiner* — Gene O Crawford
*Assistant Examiner* — Lester Rushin, III
(74) *Attorney, Agent, or Firm* — Abel Schillinger, LLP

(57) ABSTRACT

The present invention concerns an order-picking system, comprising a goods-in buffer (3) with at least one storage area (4), in which the picked goods units are stored before they leave the order-picking system, and at least one staging area (6), in which the picked goods units are staged automatically by an operating device in accordance with a predetermined sequence. In addition, the present invention comprise a pallet racking warehouse for a shipping buffer and a stacker crane for a corresponding pallet racking
(Continued)

warehouse. A gravity conveyor (5) for the staging area of the shipping buffer is also the subject-matter of the present invention.

20 Claims, 13 Drawing Sheets

(51) Int. Cl.
*B65G 1/02* (2006.01)
*B65G 1/04* (2006.01)
*B65G 1/06* (2006.01)
*B65G 1/08* (2006.01)
*B65G 13/00* (2006.01)
*B65G 13/075* (2006.01)
*B65G 37/00* (2006.01)

(52) U.S. Cl.
CPC .......... *B65G 1/0435* (2013.01); *B65G 1/065* (2013.01); *B65G 1/08* (2013.01); *B65G 1/1371* (2013.01); *B65G 13/00* (2013.01); *B65G 13/075* (2013.01); *B65G 37/005* (2013.01); *F24F 11/80* (2018.01)

(58) Field of Classification Search
CPC ........ B65G 1/08; B65G 13/00; B65G 13/075; B65G 37/005; B65G 1/1378; F24F 11/80
USPC ........................ 198/572, 347.1; 700/217, 218
See application file for complete search history.

(56) References Cited

U.S. PATENT DOCUMENTS

| | | | |
|---|---|---|---|
| 4,841,869 A | 6/1989 | Takeuchi et al. | |
| 8,827,619 B2* | 9/2014 | Schafer | B65G 1/1378 414/268 |
| 8,983,647 B1* | 3/2015 | Dwarakanath | G05D 1/0217 700/216 |
| 9,037,286 B2* | 5/2015 | Lert | B65G 1/1378 700/216 |
| 11,254,501 B2* | 2/2022 | Sullivan | B65G 1/1373 |
| 11,254,504 B2* | 2/2022 | Stevens | B65G 1/1371 |
| 2008/0231152 A1 | 9/2008 | Malin | |
| 2013/0177379 A1* | 7/2013 | Hoffman | B65G 1/1375 414/791.6 |
| 2016/0045841 A1* | 2/2016 | Kaplan | B01D 3/06 429/49 |
| 2017/0320101 A1* | 11/2017 | Bombaugh | B07C 3/14 |
| 2018/0237222 A1* | 8/2018 | Issing | B65G 1/1376 |
| 2018/0290829 A1* | 10/2018 | Schroepf | B65G 1/10 |
| 2018/0290831 A1* | 10/2018 | Wolf | F25D 13/06 |
| 2020/0216262 A1* | 7/2020 | Sigrist | B65G 17/485 |

FOREIGN PATENT DOCUMENTS

| | | |
|---|---|---|
| EP | 1213242 A1 | 6/2002 |
| EP | 1406051 A1 | 4/2004 |
| EP | 1972874 A2 | 9/2008 |
| EP | 3023364 A1 | 5/2016 |
| FR | 2337675 A1 | 8/1977 |
| NL | 7804502 A | 10/1978 |
| WO | 2009150684 A1 | 12/2009 |
| WO | 2011129699 A1 | 10/2011 |

OTHER PUBLICATIONS

Written Opinion of International Searching Authority issued in corresponding International Application No. PCT/EP2018/062264 dated Nov. 26, 2018 (13 pages).

International Search Report issued in corresponding International Application No. PCT/EP2018/062264 with English translation dated Nov. 26, 2018 (10 pages).

* cited by examiner

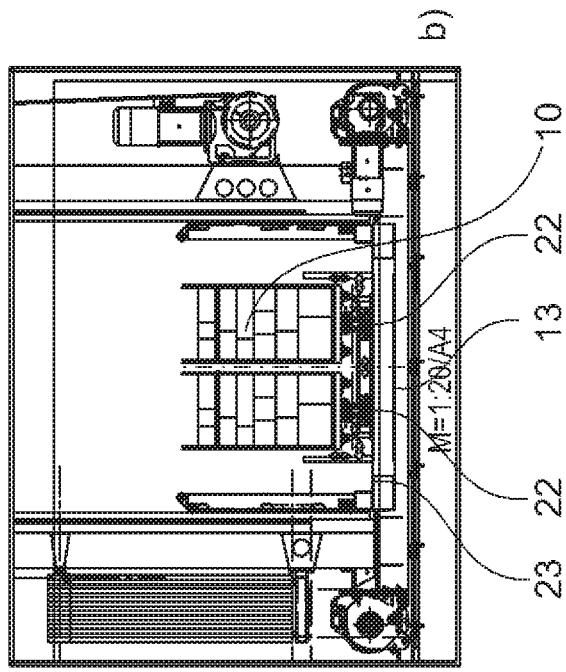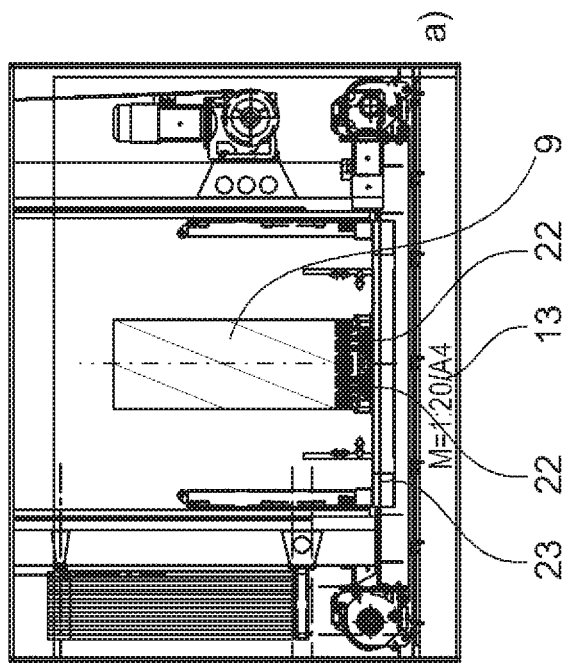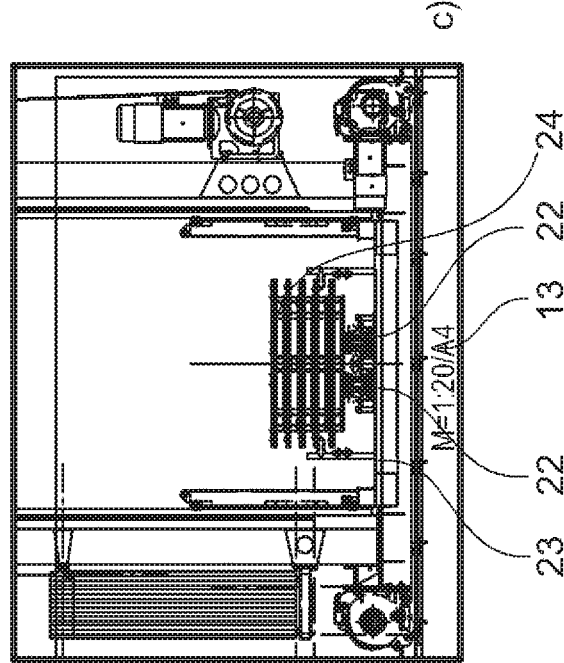
Fig. 5

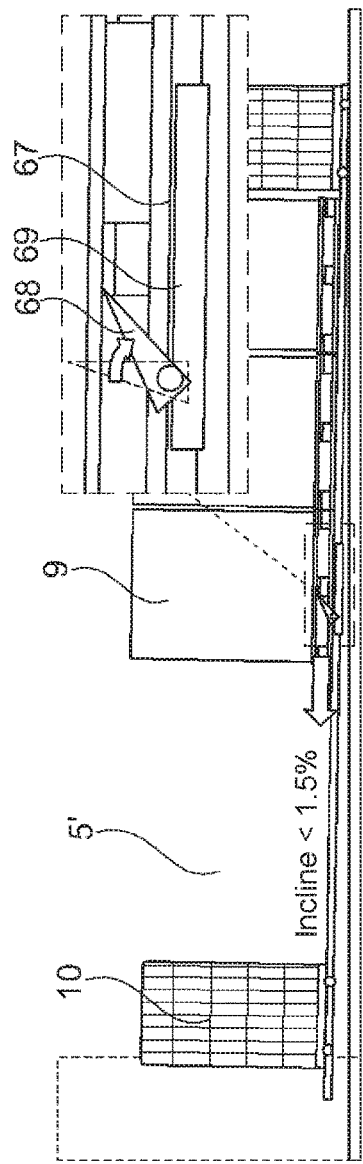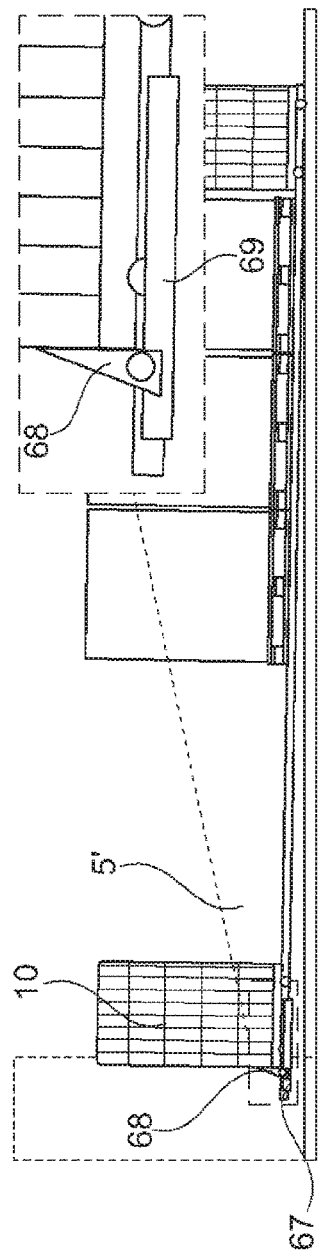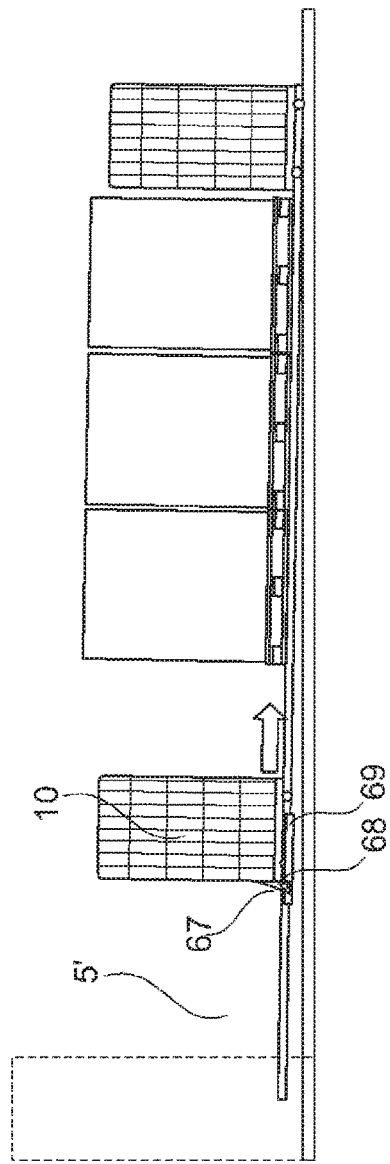

SHIPPING BUFFER FOR AN ORDER-PICKING SYSTEM

BACKGROUND OF THE INVENTION

Field of the Invention

The present invention concerns a picking system for picking different goods into goods units and a shipping buffer for such a picking system. In addition, a pallet racking warehouse for the shipping buffer and a stacker crane for the pallet racking warehouse are the subject-matter of the present invention. In addition, the present invention concerns a method for issuing picked goods units from a picking system.

Prior Art

A plurality of different goods are sold in retail stores, such as food retail stores. Accordingly, it is not possible for retail stores to stock the goods in large quantities because that would require an extraordinarily large amount of space. On the other hand, wholesalers or manufacturers of goods are not interested in delivering individual goods to retail stores as that would require a great deal of effort. Accordingly, there is a need in shipping warehouses or supply centres for order-picking goods, whereby manufacturers deliver single-variety goods in large quantities or large packing units and, after the large packing units have been broken down into individual goods or smaller packing units, these are then passed on to the retail stores. At the same time, for the purpose of simplifying transport, various goods that are to be delivered to one retail store, for example, are grouped together again to form goods units. Accordingly, the picking process can be seen as the separation or reduction of large single-variety packing units and the combination of different goods into a new goods unit.

This applies to the supplying not only of branches of retail chains, such as food chains, but also of customers of mail order companies.

Due to the plurality of different goods that have to be handled in such picking processes, different forms of packaging can also be used to produce the fully picked goods units. The food retail sector, for example, uses both pallets in the form of EU standard pallets, on which the goods are simply stacked, and roller containers comprising a platform for storing the goods, side walls for supporting the goods and rollers on the underside of the platform for moving the roller containers. In addition, other types of carriers can be provided for goods units which are composed of several different goods. The diversity of carriers, such as pallets, roller containers and other types of carriers, makes it difficult to effectively organise handling the goods units in the goods-out area.

A further difficulty consists in synchronizing the picking process with the issuing of the picked goods units in the goods-out area. If the goods are picked into corresponding goods units too early, they must be stored temporarily until the corresponding transport vehicle for transporting the picked goods units to the recipient is ready for the purpose of collection. This can cause blocking of necessary traffic routes within the picking system. On the other hand, if picking of the goods units starts too late, this can lead to unwanted waiting times and downtimes for the transport vehicles, such as trucks, supplying the retail stores.

DISCLOSURE OF THE INVENTION

Object of the Invention

It is therefore the object of the present invention to provide an order-picking system, or especially a method for issuing picked goods units from an order-picking system that can cope with different carriers for the different goods and also ensure effective goods-out area. In addition, the inventive solution shall be technically easy to implement and handle.

Technical Solution

This object is solved by an order-picking system, a shipping buffer for such an order-picking system, a pallet racking warehouse for the shipping buffer, and a stacker crane for the pallet racking warehouse as set forth in the independent claims. Furthermore, the object is solved by a gravity conveyor for the shipping buffer and a corresponding method for issuing picked goods units from a picking system as also set forth in the independent claims. Advantageous embodiments are the subject of the dependent claims.

The present invention proceeds from the knowledge that the aforementioned problems with an order-picking system or a method for operating such an order-picking system can be solved by the picking system's having a shipping buffer, whereby the shipping buffer has at least one storage area in which the picked goods units can be stored temporarily before they leave the picking system. In addition to the storage area, however, at least one staging area and at least one automated operating device are proposed, whereby in the staging area the picked goods units can be automatically staged by the operating device in accordance with a predefined order. Through the provision of a storage area and a staging area, the shipping buffer is thus additionally divided into different areas, whereby the fully picked goods units in the staging area are arranged according to a desired issuing sequence for their impending removal. The storage area, on the other hand, is mainly used for buffering and enables goods to be picked at any time independently of the collection time. The provision of an automated operating device, for example in the form of a stacker crane, which connects the storage area and the staging area with each other and enables their automated operation, simultaneously makes for effective and space-saving implementation. As a result, the storage area can be configured as a pallet warehouse, for example in the form of a high-bay warehouse.

The effectiveness of the inventive shipping buffer for an order picking system can be additionally increased by providing at least one gravity conveyor in the staging area, such that transport of the fully picked goods units in the staging area can be automated too.

Accordingly, from a further aspect of the present invention, for which protection is sought independently and in combination with the other aspects of the invention, a gravity conveyor is claimed which enables the safe transport of, in particular, different carriers of the picked goods, such as pallets and roller containers, as a solution to the problem associated with the handling of different carrier systems for the picked goods.

Accordingly, from a further aspect, independent protection is sought for a stacker crane for handling the goods units which has a lifting unit for lifting and carrying the various carriers, whereby the lifting unit is itself designed to be adjustable to accommodate the various carriers.

For the purpose of handling different carriers for the picked goods, such as EU standard pallets and roller containers, the stacker crane can be configured such that the lifting unit has two telescopic prongs, the distance between which is adjustable. This makes it possible to use the stacker crane, which can connect the storage area of a shipping buffer with the staging area of the shipping buffer, for different goods carriers.

In addition, the stacker crane can be configured such that a prong of the lifting unit has a width which is dimensioned such that a carrier for picked goods can be safely accommodated on a single prong. In this regard, the width is the direction of extension of the prong transverse to the direction in which the prong can be telescoped or extended towards a rack location of a rack storage system. Accordingly, the width is parallel with the direction of travel of the stacker crane in a storage aisle between two racks.

Consequently, such a stacker crane can carry at least two roller containers at the same time.

A gravity conveyor can be provided in the staging area of a shipping buffer of the invention for an order-picking system, said conveyor comprising a transport track, which is inclined to the horizontal, and transport means, such that goods carriers disposed on the transport track are moved at least partially under the force of gravity. Such a gravity conveyor facilitates automated movement of the picked goods units in the staging area, because the goods units disposed on the gravity conveyor can automatically slide or roll forward after a first goods unit has been removed from the gravity conveyor. At the same time, such automated movement is very easy to achieve, with the result that largely automated staging of the goods units to be issued can be achieved in a simple way.

In addition, such a gravity conveyor can be designed to transport at least two different carriers simultaneously on the gravity conveyor. In particular, at least first self-propelled carriers having wheels on their undersides, such as roller containers, and at least second non-self-propelled carriers having contact surfaces on their undersides, such as EU standard pallets, can be conveyed simultaneously on the gravity conveyor.

In order to ensure that issuing of the picked goods units proceeds seamlessly, a corresponding gravity conveyor can also have a motor-driven pushing element that can be moved along the transport track, so that additionally at least one type of carrier on the transport track can be pushed and not merely moved under the force of gravity. Protection for this aspect is also sought independently and in combination with other aspects of the invention.

The pushing element can be designed as a pusher-dog carriage, which can be slid or driven or moved in any other way in the transport direction of the gravity conveyor and in the opposite direction.

In addition, the pushing element can be designed such that it has a pushing function in the transport direction only, but no pushing function in the direction of movement opposite to the transport direction. This makes it possible for the pushing element to be moved in the direction opposite to the transport direction and past the carriers located on the transport track, without causing the carriers or goods units on the gravity conveyor to move.

Despite a corresponding pushing element or pusher-dog carriage, respectively, which is driven the transport track can, for the purpose of gravity conveying by the carriers themselves, have drivable transport means, for example rollers, wheels, endless belts and the like. In addition, it is also possible to provide driving tracks and sliding elements on which the carriers can move independently and autonomously.

The transport track of the gravity conveyor can have one or more transport levels on which the goods units or their carriers can move. By virtue of the different transport levels, which are defined, for example, by the contact surfaces of the carriers on the gravity conveyor, it is possible to achieve different movement possibilities for the various carriers. In addition, the transport track can also have several transport areas which extend parallel with each other along the transport direction of the transport track and which can also be used to move the different carriers in different ways. The transport areas can also be grouped together, with each group being configured for one or more types of carrier. In addition, a combination of different transport areas and transport levels can be provided.

In particular, the transport areas can be separated from each other by one or more recesses that extend parallel with the transport areas along the transport direction of the transport track. Such recesses can be used in particular for the disposal of the pushing element and/or can define free spaces into which can project the parts of various carriers, such as the wheels of roller containers.

In addition, the different transport areas can be provided with different transporting means such that different movements of the various carriers for the picked goods can be achieved in this way, too. Thus, two parallel roller conveyors and two parallel driving tracks can be provided, with the EU standard pallets capable of being moved on the two roller conveyors, while the roller containers on their wheels can roll independently on the parallel driving tracks.

Braking devices and/or identification devices for the moved goods units can be provided at the end of the gravity conveyor for the purpose of activating suitable braking devices.

In the inventive shipping buffer, a pallet racking warehouse having at least two racks can be provided, each having a plurality of rack locations which are disposed side by side and above one another, in which the picked goods units can be stored. In the pallet racking warehouse, the stacker crane can be movable in a plane between the racks, such that the stacker crane can approach each rack location and store or retrieve corresponding goods units from a carrier and a plurality of different goods.

In order that the combination between the staging area and the storage area of the inventive shipping buffer may be achieved, the pallet racking warehouse can be designed such that one end of a gravity conveyor is disposed in at least one area of the rack location, such that the stacker crane can place the goods units on the end of the gravity conveyor, which is disposed in the area of a rack location, for the purpose of transfer to the staging area.

In addition, it is advantageous to provide a pallet racking warehouse with an air-conditioning housing in order that the rack locations may be operated at different temperatures from the ambient temperature and/or at different temperatures from each other. This increases the scope for using the shipping buffer or a corresponding pallet racking warehouse as a shipping buffer, because temperature-sensitive goods, such as fresh food and the like, can also be handled.

For this purpose, the pallet racking warehouse can comprise air-conditioning units that, in particular, can create different climate zones in the pallet racking warehouse. This can be achieved in particular by providing suitable currents of appropriate temperature-control media, such as air.

With the inventive shipping buffer for an order-picking system or with a correspondingly equipped order-picking system, it is thus possible to carry out picking independently of the hand-over time for the picked goods, for example the collection time by truck, as the various goods assembled into goods units can first be stored in a shipping buffer, more precisely especially in a storage area of the shipping buffer. From there, they can be removed via a stacker crane in an automated manner and in a predetermined sequence to a staging area, from where they can be issued in the order defined by the sequence. In particular, this can proceed in a fully automated manner, such that the need for keeping additional personnel available for the goods-out area can be eliminated. The staging of the goods units in a predefined order makes it easy to optimise loading of the trucks that deliver the goods units.

BRIEF DESCRIPTION OF THE DRAWINGS

The attached drawings show here in purely schematic form in

FIG. 5 Side views of an inventive stacker crane with adjustable lifting means in FIGS. 5a) to 5c);

EMBODIMENTS

Further advantages, characteristics and features of the present invention are apparent from the following detailed description of an embodiment using the enclosed drawings. However, the invention is not limited to these embodiments.

Figure 1:
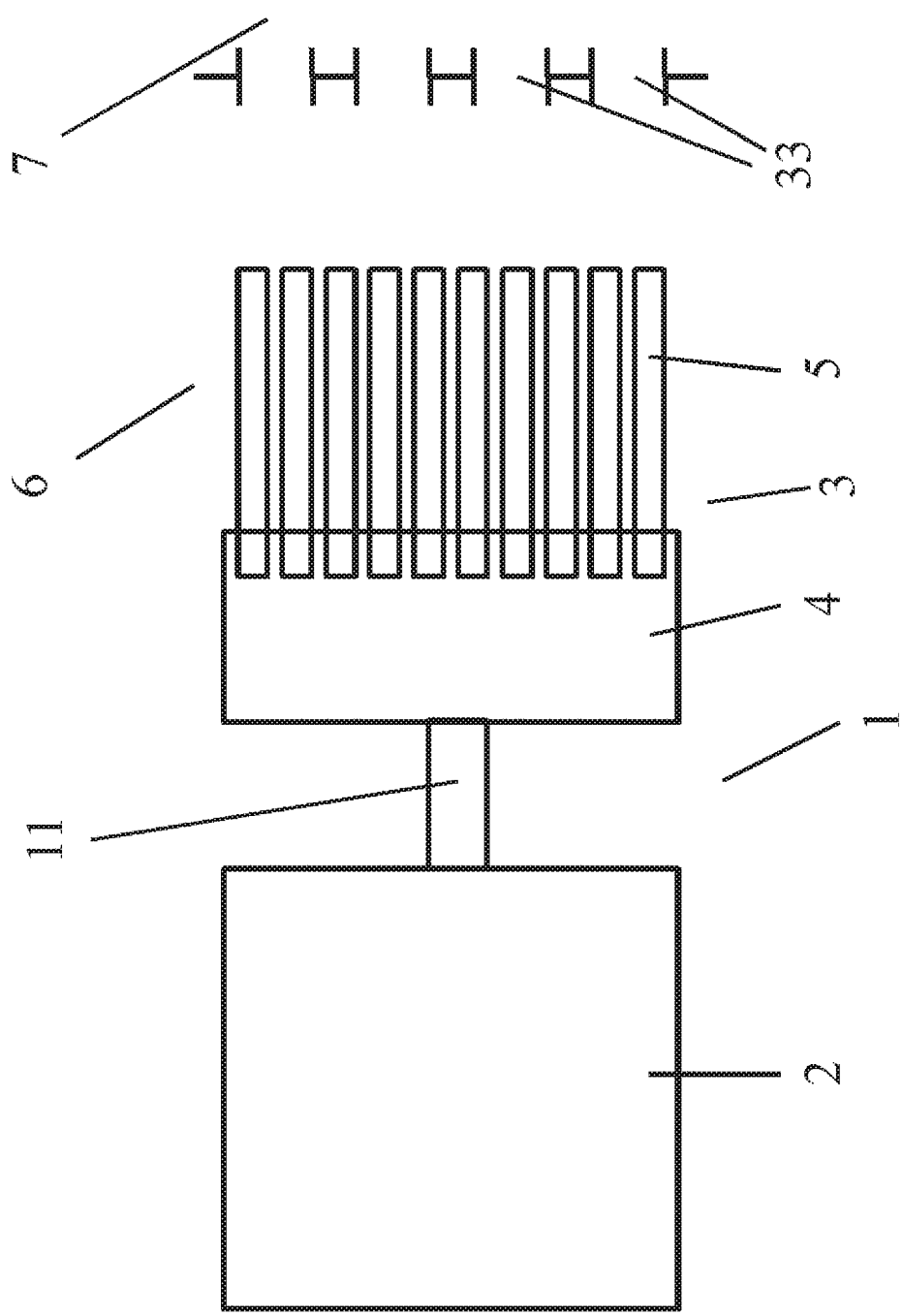
FIG. 1 An overview of an order-picking system with an inventive shipping buffer.

FIG. 1 shows a schematic representation of an inventive order-picking system 1, which comprises a picking area 2 and a shipping buffer 3. Picking area 2 is the goods-in area for goods of the same kind which have been composed into large packing units, whereby these packing units are broken down into individual goods in picking area 2 in order that goods units comprising different goods may be assembled for further shipping. This is the case for shipping warehouses, for example, that supply retail stores with the different goods in the assortment. In the shipping warehouse or the corresponding order-picking system that forms the shipping warehouse or is integrated into it, a plurality of different goods are thus repacked from packing units containing single-variety goods into goods units containing mixed goods in order that the individual stores may be supplied with smaller quantities. In this way, it is possible for the goods manufacturers to deliver bulk quantities of the goods in packing units, while the picking process yields goods units for shipping to the individual stores, with a single goods unit containing a wide variety of goods. The same picking principle can also be employed at mail-order companies, which also procure a wide variety of goods in bulk and send different combinations of goods to individual customers. Accordingly, it is customary for the picking area to have a corresponding store for the single-variety packing units or for a corresponding store to be adjacent to the picking area 2, such that the single-variety packing units can be made available for picking in picking area 2.

In addition to the picking area 2, the inventive order-picking system 1 comprises a shipping buffer 3, which comprises a storage area 4 and a staging area 6. In the embodiment shown, a plurality of gravity conveyors 5 are provided in the staging area 6, whereby the staging area 6 can also be designed differently, even though gravity conveyors 5, as will be shown later, are advantageous. Directly in the vicinity of and assigned to the staging area 6 is the goods-out area comprising, for example, a loading ramp 7 and exit gates 33.

Provided between the shipping buffer 3 and the picking area 2 is a goods-unit passageway 11 via which the picked goods units can be transferred to the shipping buffer 3. Instead of the single goods-unit passageway 11 shown in FIG. 1, several goods-unit passageways can be provided and, in addition, by-pass transport routes (not shown) can be provided which enable the fully picked goods units to be issued direct to the goods-out area, by-passing the shipping buffer 3.

Figure 2:
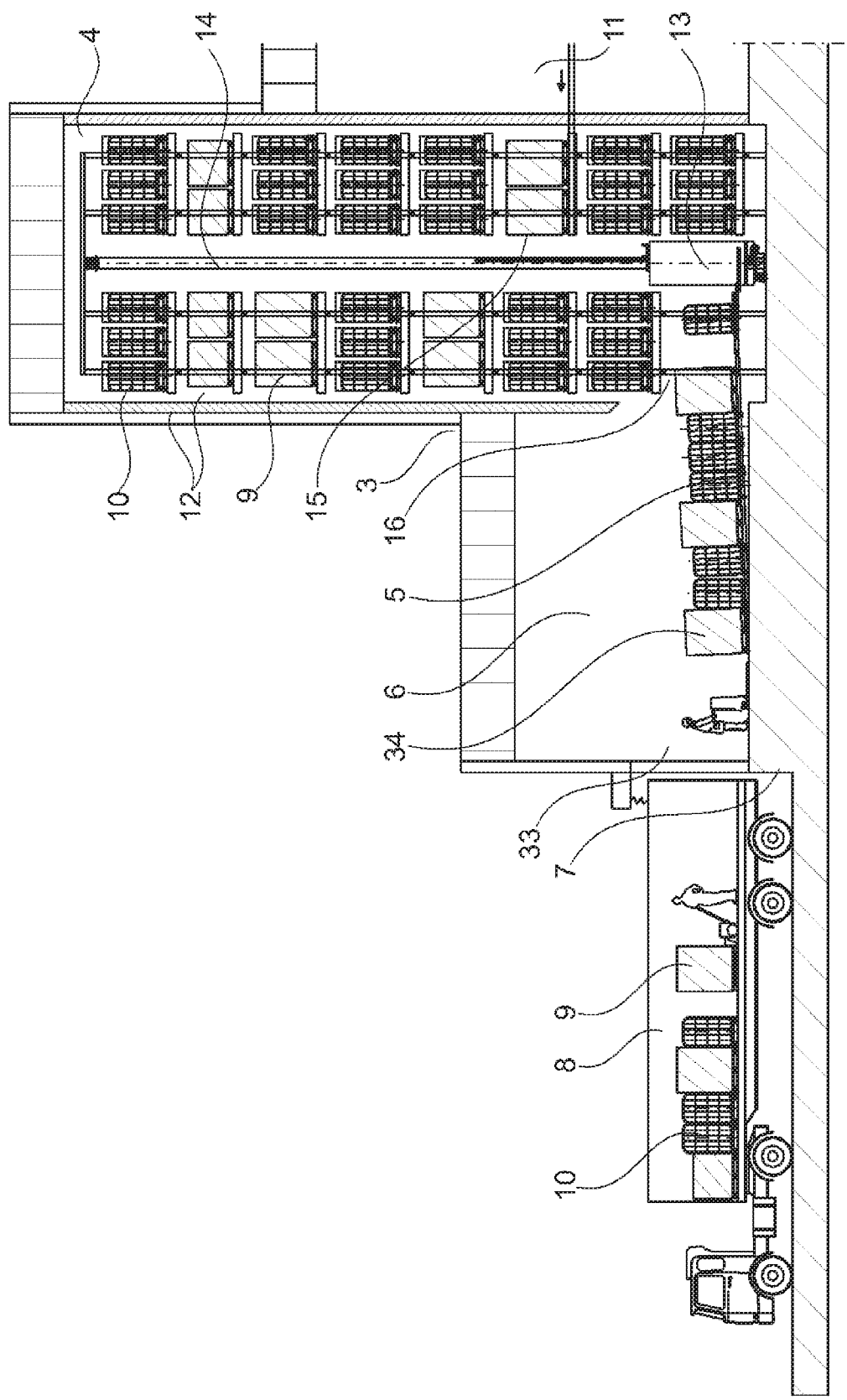
FIG. 2 A sectional view through a shipping buffer.

FIG. 2 shows a sectional view of the inventive shipping buffer 3, whereby it can be seen that storage area 4 in the embodiment shown is configured as a pallet racking warehouse.

The pallet racking warehouse has a plurality of rack locations 12 in which different goods units 9, 10 can be stored. For example, the goods unit 9 is a pallet stack stored on a Euro pallet, while the goods unit 10 is a roller container.

As shown in FIG. 2, the rack locations 12 are designed such that three roller containers 10 or two pallets 9 can be stored one behind the other. The pallet racking warehouse comprises a total of 2 racks, between which there is a storage aisle along which a rack vehicle 13 can move. In addition, a pallet holder of the stacker crane 13 can be adjusted vertically along a mast 14, such that, along a plane spanned by the aisle and the vertical direction thereto, the pallet holder of the stacker crane 13 can reach each rack location 12 of the pallet racking warehouse, such that goods units 9, 10 can be stored in and retrieved from the rack locations 12 of the pallet racking warehouse. For this purpose, as will be shown later, the rack vehicle 13 has, in the direction of the rack locations, telescopic lifting means in the form of prongs, which enable the goods units 9, 10 to be removed from or stored in the rack locations 12.

Integrated into the pallet racking warehouse is the storage bay 15 and the retrieval bay 16, whereby both the storage bay 15 and the retrieval bay 16 are each disposed in the area of a rack location.

The storage bay 15 is the end of the goods-unit passageway 11, whereby this can comprise any conveyor that delivers goods units from the picking area 2 for transfer to the shipping buffer. From the picking area, the fully picked goods units 9, 10 are thus conveyed via the goods-unit passageway 11 to the storage bay 15 acting as the transfer point, where the rack vehicle 13 can take over the goods units 9, 10 and store them in the rack locations 12 of the rack area 4.

In addition, storage area 4 of the shipping buffer 3 comprises a plurality of goods-out bays 16, which simultaneously form the entrance to the staging area. In the present embodiment, all the rack locations at the lowest level along the issuing side of the rack are designed as goods-out bays 16, so that the gravity conveyors 5 forming the staging area protrude into the corresponding rack. When the goods units 9, 10 are being retrieved from the storage area 4 of the shipping buffer 3, the stacker crane 13 retrieves the goods units 9, 10 to be retrieved from the rack locations 12 and places them on the gravity conveyors 5 of the staging area or at the goods-out bays 16. From there, the goods units automatically move along the gravity conveyor to a pick-up bay from where they can be removed out of the staging area for the purpose of loading a truck.

Storage of goods units in the storage area 4 of the shipping buffer 3 and their staging in the staging area or in the gravity conveyors 5 is controlled by a programmed data processing system. This is preferably integrated into the data controller of the entire order-picking system. Thus, the order-picking system first logs incoming picking orders and controls and monitors the corresponding picking process. With the shipping buffer 3, picking can now take place independently of any predetermined or expected goods shipping time, as the fully picked goods units can be stored temporarily or buffered in the shipping buffer 3. At the predetermined or desired goods shipping time, the fully picked goods units 9, 10 are then transferred from the storage area 4 of the shipping buffer 3 to the staging area, from where they can be loaded directly into a corresponding transport vehicle, such as a truck. By means of appropriate software control, the goods units 9, 10 can be kept ready in the staging area in any desired sequence corresponding to a desired loading configuration for the truck 8. This loading configuration can, for example, be based on the route driven to the recipients and/or any necessary or desired weight distribution in the truck 8. When the goods units 9, 10 are disposed in the staging area 6, a truck driver collecting the picked goods units can be assigned to a gate 33 of the loading ramp 7, assigned to the staging area 6, where the truck driver can load the picked goods units 9, 10 into the truck 8 independently.

This is facilitated in particular by the gravity conveyors 5 in the staging area 6 used in the embodiment shown, which ensure automatic feeding of the goods units to a pick-up point 34 for the truck driver. Accordingly, the truck driver only has to pick up the individual goods units 9, 10 at the pick-up point 34, for example with a hand pallet truck, and transfer them to his truck in the given sequence so that he has a loaded truck 8 containing the goods units in a desired loading scheme.

Since, by virtue of the fact that a truck 8 is assigned to a specific gate 33 of the goods-out area or to a specific staging area 6, it is clearly defined which goods units 9, 10 are to be loaded into the truck 8, no additional personnel from the picking system is required to organise the goods-out area. In addition, an automated display or a printout of loading information can be automatically provided for the truck driver.

As can be seen from FIG. 1, several gravity conveyors 5 of the staging area can be assigned to a gate 33 of the goods-out area. The number of the corresponding gravity conveyors 5 depends on the local situation, such as the number of goods units 9, 10 that are to be kept ready in the staging area, and varies within the given boundary conditions.

Figure 3:
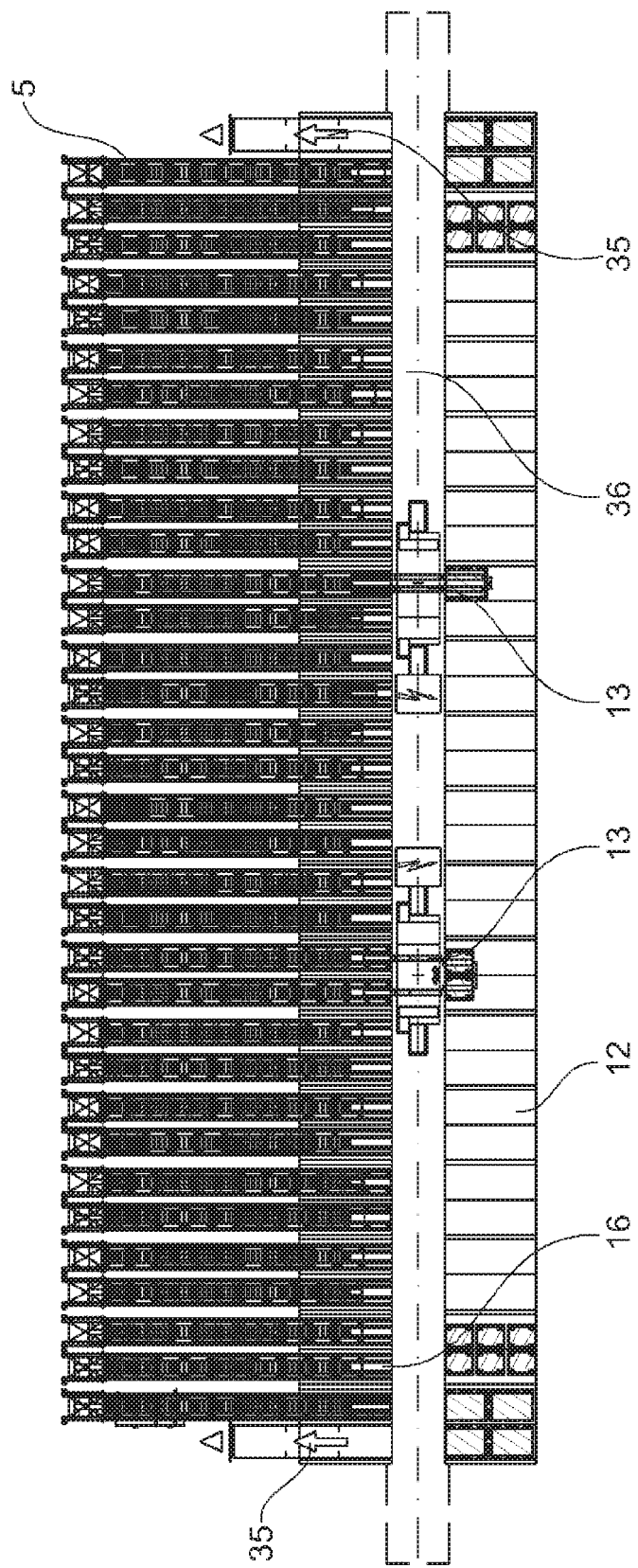
FIG. 3 A plan view of a horizontal section through the shipping buffer of FIG. 2.

FIG. 3 shows a horizontal section through the shipping buffer 3, as shown in FIG. 2, more precisely in the area of the lowest rack locations or the issuing bays 16. The plan view clearly shows two stacker cranes 13 which are movably disposed along storage aisle 36 and which serve, on one hand, the rack locations 12 and, on the other, the issuing bays 16 for transferring the goods units to the staging area 6 and storage bay 15. In addition, provided to the left and right of the gravity conveyors 5 in FIG. 3 are two additional retrieval sections 35, which can be used for staging special goods or for special cases.

Figure 4:
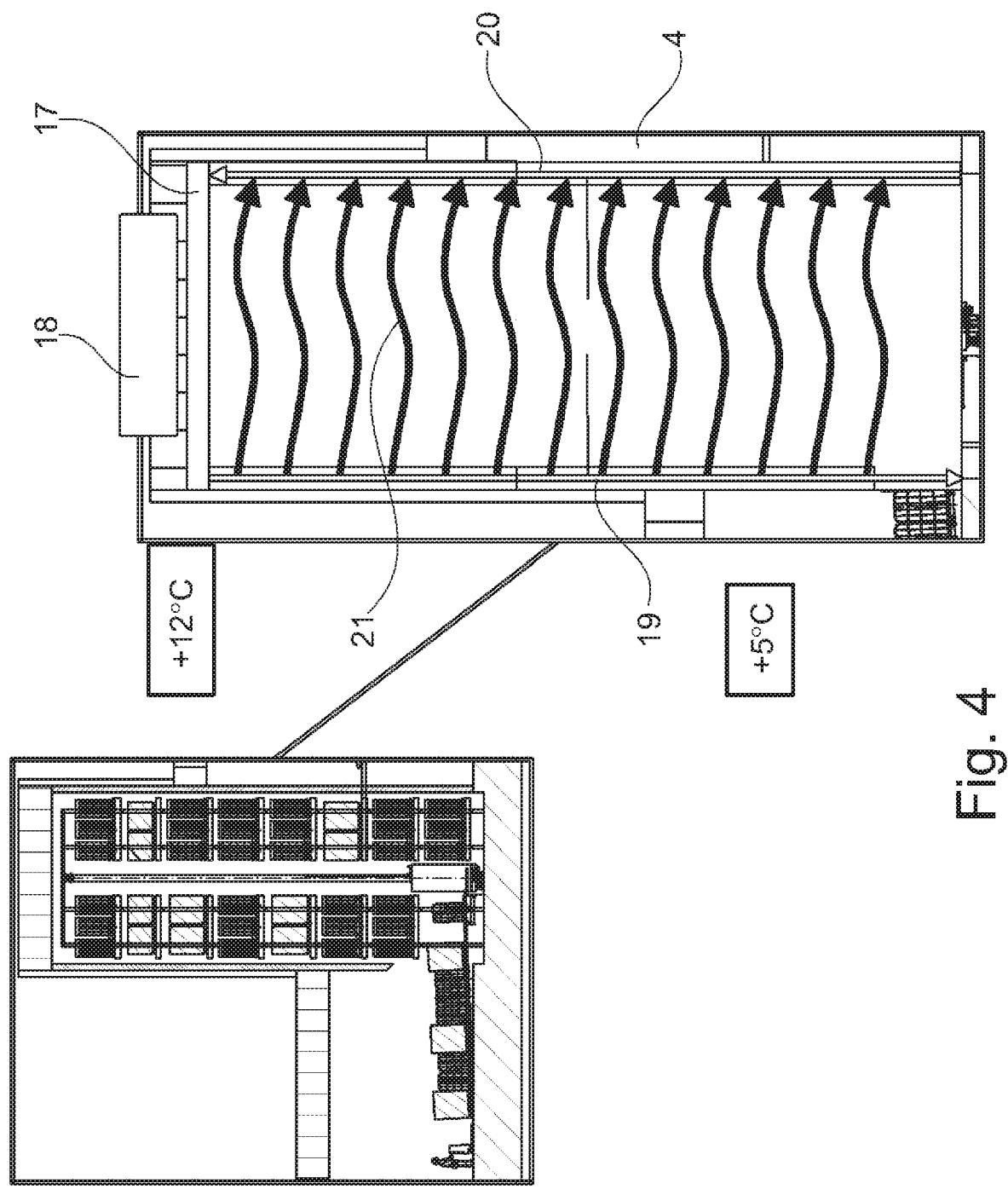
FIG. 4 A detailed view of the shipping buffer as shown in FIG. 2.

FIG. 4 is a detailed view of FIG. 2 and shows an embodiment of the storage area 4, in which there is a thermally-insulating housing 17, which directly closes off the rack locations and encompasses not only the storage aisle, but also the storage bay 15 and the issuing bays 16. In the housing 17, corresponding openings, in particular closable openings, are to be provided only at the storage bay 15 and at the issuing bays 16.

The thermally-insulating housing 17 is used to set the temperature in storage area 4, for which purpose air-conditioning units 18 in the form of heating and/or cooling units are provided. A corresponding temperature-control medium, such as air, can be brought to the desired temperatures by the air-conditioning units 18 and introduced into the housing 17 in order to set the desired temperatures there.

In particular, the pallet racking warehouse shown in the embodiment in FIG. 4 may have several climate zones, such that provision can be made in the pallet racking warehouse for different goods, such as temperature-sensitive goods that need to be cooled. In the embodiment shown, the pallet racking warehouse, which is designed as a high-bay warehouse, is divided into several climate zones, with warmer zones in the upper area and cooler zones in the lower area. For example, the temperature in the upper area of the pallet racking warehouse can be set to approx. 12° C., while a temperature of 5° C. can be set in the lower area of the pallet racking warehouse. This can be achieved, for example, by introducing the temperature-control medium, such as cooling and/or heating air, into the interior of the housing via lines 19, 20 and extracting it again on the opposite side, such that horizontal currents of the temperature-control media are generated. This allows different zones of various temperatures to be set.

FIGS. 5 $a$) to 5$c$) show a stacker crane 13 of the kind that can be used in storage area 4 of the shipping buffer. The stacker crane 13 comprises a goods unit holder 23, on which is disposed lifting means 22 in the form of prongs which can be telescoped perpendicularly to the image plane in order that they may reach into the rack locations 12 of the pallet racking warehouse. In addition, however, the distance between the lifting means in the form of the prongs, as shown in FIGS. 5 $a$) to 5$c$), can also be adjusted such that different goods units can be carried.

In FIG. 5 $a$), the prongs 22 of the stacker crane 13 are disposed close to each other to accommodate a goods unit 9 in the form of a pallet. In FIG. 5$b$), the prongs 22 have moved apart such that there is a greater distance between them than in FIG. 5$a$), such that the stacker crane 13 can accommodate two roller containers next to one another on the goods unit holder 23.

FIG. 5$c$) shows that the stacker crane 13 with the lifting means 23 also serves to accommodate "slave" pallets used for storing roller containers in the rack.

Figure 6:
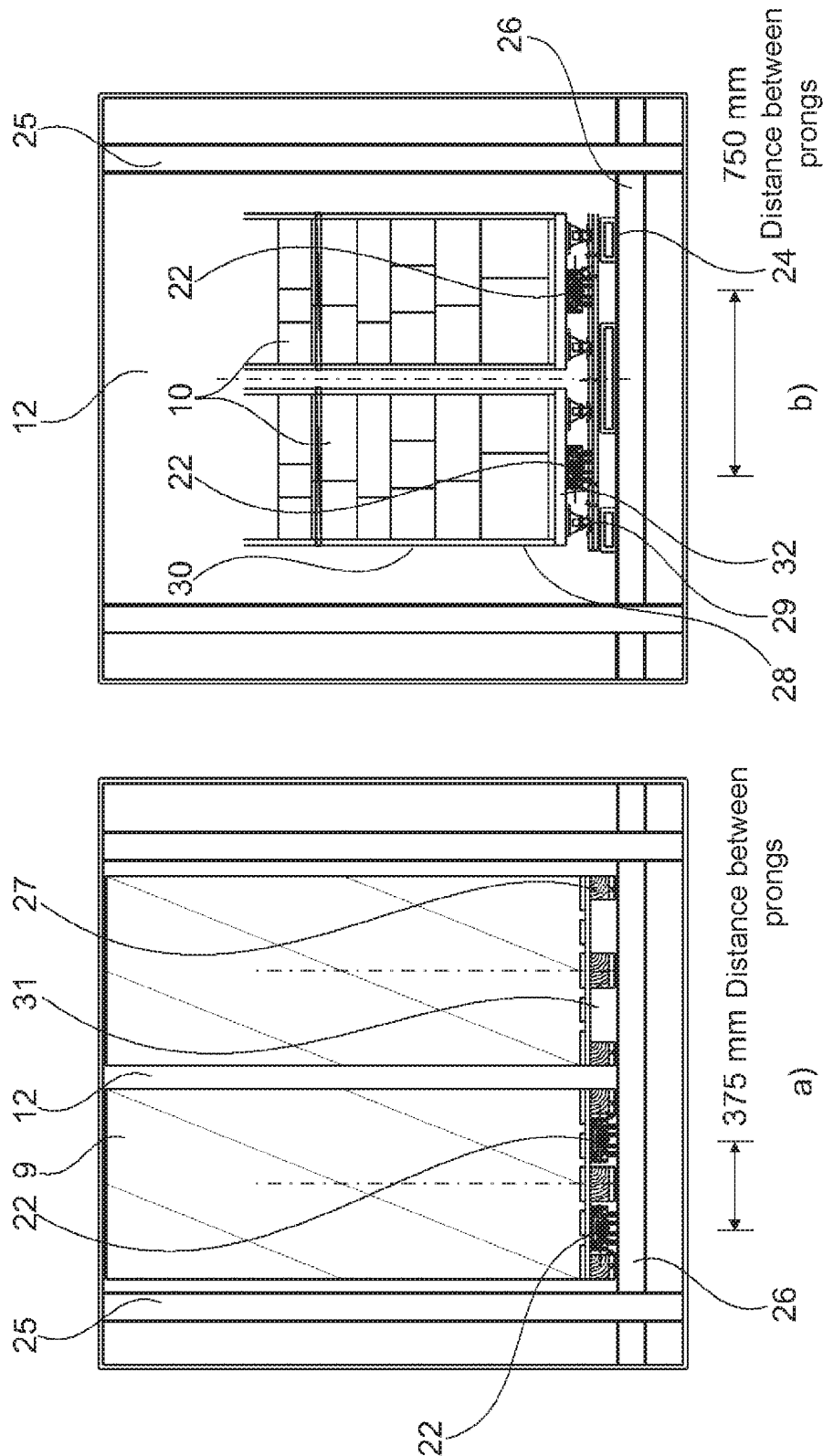
FIG. 6 A sectional view through rack locations of a rack of the shipping buffer when loading or unloading goods units in FIGS. 6a) and 6b)

FIGS. 6a) and 6b) show the storage of the various goods units 9, 10 in the pallet racking warehouse, with the vertical supports 25 and the cross members or base plates 26 of the pallet racking warehouse or the racking warehouses also visible. In FIG. 6 a), pallets are stored in the rack location 12, whereby it is shown that the left pallet is being stored or retrieved by the lifting means 22 of the rack vehicle 13. To this end, the pallet 27 of the pallet goods unit 9 has free spaces 31 with which the prongs 22 of the stacker crane can engage.

FIG. 6 b) shows that two goods units 10 based on roller containers 28 are disposed next to each other on a "slave" pallet 24, whereby the prongs 22, spaced further apart as shown in FIG. 5, can remove the roller containers 28 simultaneously. The roller containers 28 have a base plate 32 and lateral supporting walls 30 as well as rollers 29 which enable them to be driven. The rollers 29 are accommodated in corresponding recesses of the slave pallet 24 during storage.

Figure 7:
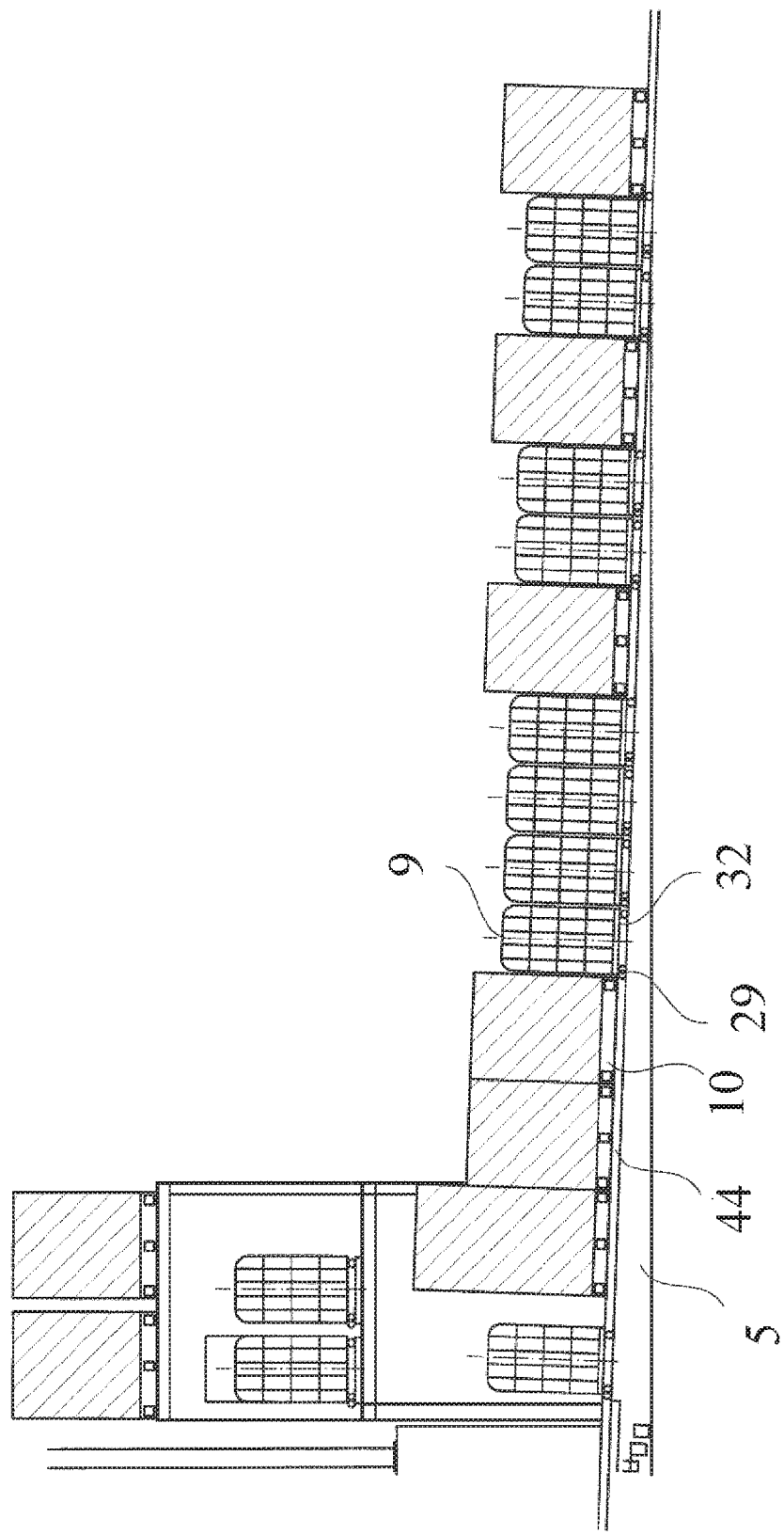
FIG. 7 A side view of a first embodiment of an inventive gravity conveyor of a shipping buffer.

FIG. 7 shows a side view of a gravity conveyor 5 of the kind that may be provided in the staging area 6 of the shipping buffer 3.

The first embodiment shown in FIG. 7 of an inventive gravity conveyor 5 in the form of a roller conveyor can simultaneously or consecutively transport different goods units 9, 10 based on roller containers and EU standard pallets. Transport proceeds under the force of gravity of the goods units 9, 10 and the inclined arrangement of the roller conveyor 5.

The side view shows a member 44 of the gravity roller conveyor 5, which is clearly inclined to the horizontal, more precisely from the left side of the drawing to the right side and from top to bottom. Accordingly, the goods units 9, 10, by virtue of their own weight and the goods on the roller containers or pallets on the roller conveyor 5 in FIG. 1, are moved to the right under the force of gravity.

Figure 8:
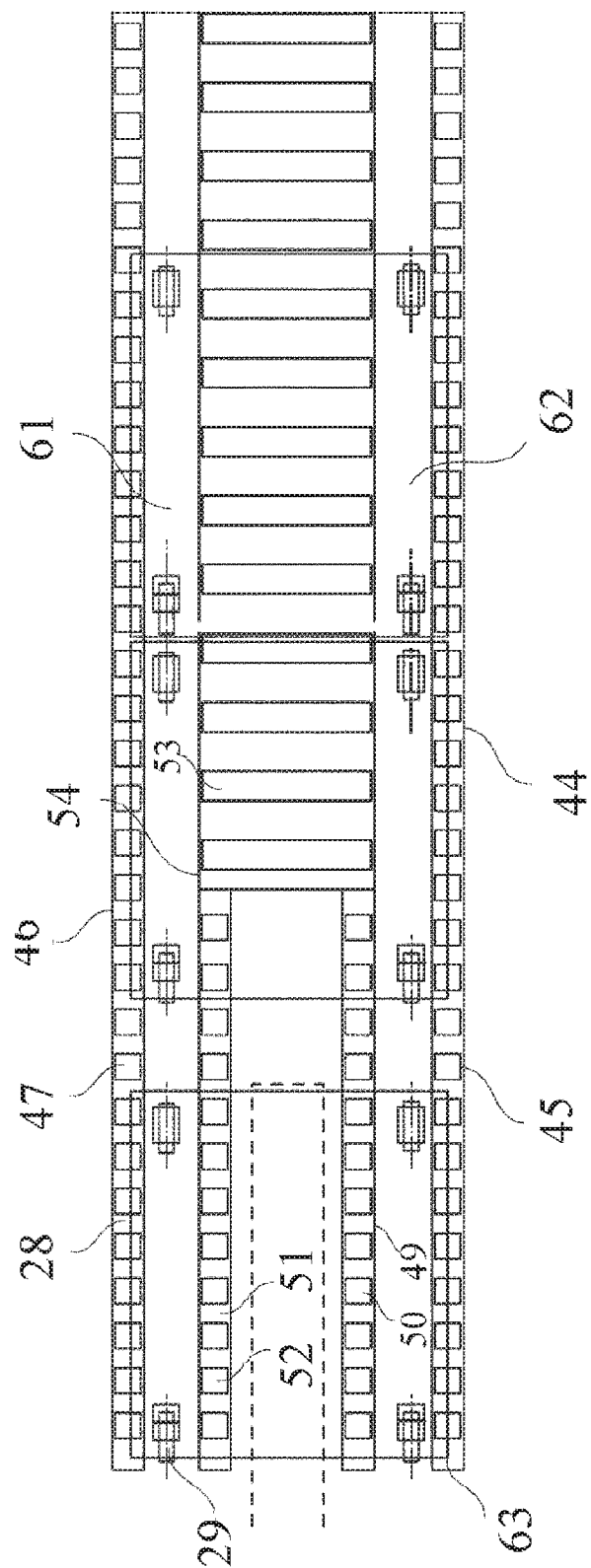
FIG. 8 A plan view of the gravity conveyor from FIG. 7.

FIG. 8 shows a plan view of the gravity roller conveyor 5 from FIG. 7. In the lower area of FIG. 8 can be seen the member 44, in which are disposed a plurality of rollers 45 which are freely rotatable in the member 44. Parallel with the member 44 and spaced at a distance from it is disposed a member 46 which also has a plurality of rollers 47, which in turn are mounted so as to freely rotate in the member 46. Two further members 49 and 51 are disposed between members 44 and 46 in one section of the gravity roller conveyor 5, while a plate 54 is provided in another section of the gravity roller conveyor 5. Mounted in the members 49 and 51 as well as in the plate 54 are a plurality of rollers 50, 52, 53 one behind the other along the transport direction. A recess 61 is formed between the members 46 and 51 and between the member 46 and the plate 53, while a recess 62 is provided between the member 44 and the member 49 and between the member 44 and the plate 54. The recesses 61 and 62 are provided continuously along the entire length of the gravity roller conveyor 5 along the transport direction, whereby the recesses 61 and 62 provide sufficiently deep free space to accommodate the wheels 29 of the roller containers 28 when the roller containers 28 are mounted on the roller conveyors 44, 45; 46, 47; 49, 50; 51, 52 and 53, 54 with their base plate 32 (see FIG. 7).

The rollers 45, 47, 50, 52, 53 are mounted in the members 44, 46, 49, 51 and the plate 54 such that they define a uniform transport plane, which means that they are disposed such that a flat object placed on the rollers 45, 47, 50, 52 and 53 touches the rollers of all the roller conveyors.

Alternatively, the transport planes for the individual roller conveyors 44, 45; 46, 47; 49, 50; 51, 52; 53, 54 could define different transport planes, whereby, for example, roller conveyors could be combined to define a transport area, such as the roller conveyors 44, 45 and 46, 47, such that one type of carrier, for example the roller containers 28, could only be moved on these roller conveyors, while a second type of carrier, for example the EU standard pallets 27, could be moved on the roller conveyors 49, 50 and 51, 52 and 53, 54, respectively, which could then define a different transport plane.

In the embodiment shown in FIG. 8, the roller containers 28 and their base plates 32 rest on the roller conveyors 44, 45; 46, 47 as well as 49, 50 and 51, 52 or 53, 54 and, due to the freely rotatable rollers, are conveyed under the force of gravity commensurate with the inclination of the gravity roller conveyor, whereby the wheels 29 on the underside of the roller containers 28 are carried along contactlessly in the recesses 61 and 62.

The EU standard pallets can be mounted either only by the central roller conveyors 49, 50 and 51, 52 and 53, 54 respectively or also by all roller conveyors 49, 50; 51, 52; 53, 54 or only by the outer roller conveyors 44, 45 and 46, 47 and, due to the freely rotatable rollers 45, 47, 50, 52, 53, can be moved commensurately with the inclination of the gravity roller conveyor 1.

Figure 9:
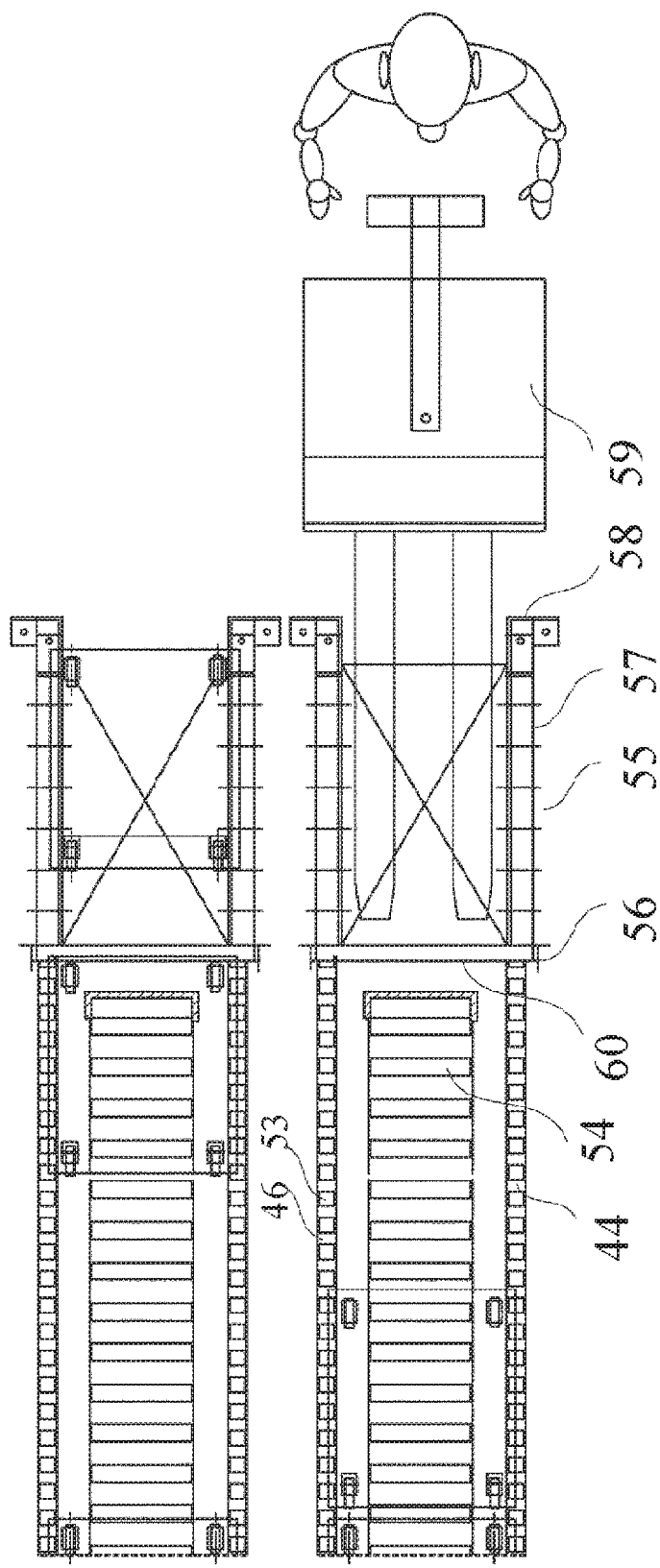
FIG. 9 A further plan view of the gravity conveyor from FIG. 7.

At the end of the gravity roller conveyor 5, which is described in more detail in FIG. 9 using the embodiment of one of two side-by-side gravity roller conveyors 5, there is a hand-over station 55 where the goods units 9, 10, i.e. the roller containers 8 or the EU standard pallets 27 conveyed there are handed-over, for example, to pallet trucks for loading trucks. While the EU standard pallets, mounted by their contact surfaces on the rollers of the roller conveyors, can make do with slide rails 57 on which the EU standard pallets can slide by means of their residual movement energy to the end of the gravity roller conveyor 5 and can be braked accordingly by friction during the sliding movement, additional braking devices can be provided, especially for the roller containers. For example, a stop 58 may also be provided as a braking device for the EU standard pallets, enabling the EU standard pallets to be braked to a complete standstill.

The roller containers 28 can also be braked in the same way, although it is advantageous here if, at the hand-over station 55, the roller containers 28 are already mounted on their wheels in order that the roller containers 28 can roll away easily from the hand-over station 55. For this reason, a separate braking device (not shown) may be provided for the roller containers 28 in the form of a rocker brake or the like which brakes the movement of the roller containers 28, but then facilitates simple removal of the roller containers from the hand-over station 55 by rocking back again.

In order that the separate braking device for the roller containers 28 may be activated, an additional identification device 56 may be provided to identify the type of goods unit approaching the hand-over station 55 at the end of the gravity roller conveyor 5. This can be achieved by various electronic, mechanical or electromechanical systems, whereby a simple mechanical system is shown in FIG. 9 in which a pivotable bar 60 which is provided across the gravity roller conveyor 5 at the transition to the hand-over station 55 can be moved by the wheels 29 of a roller container 28, for example pressed downwards, such that this movement of the bar 60 can trigger a mechanical release on a braking device, for example in the form of a rocker brake.

Figure 10:
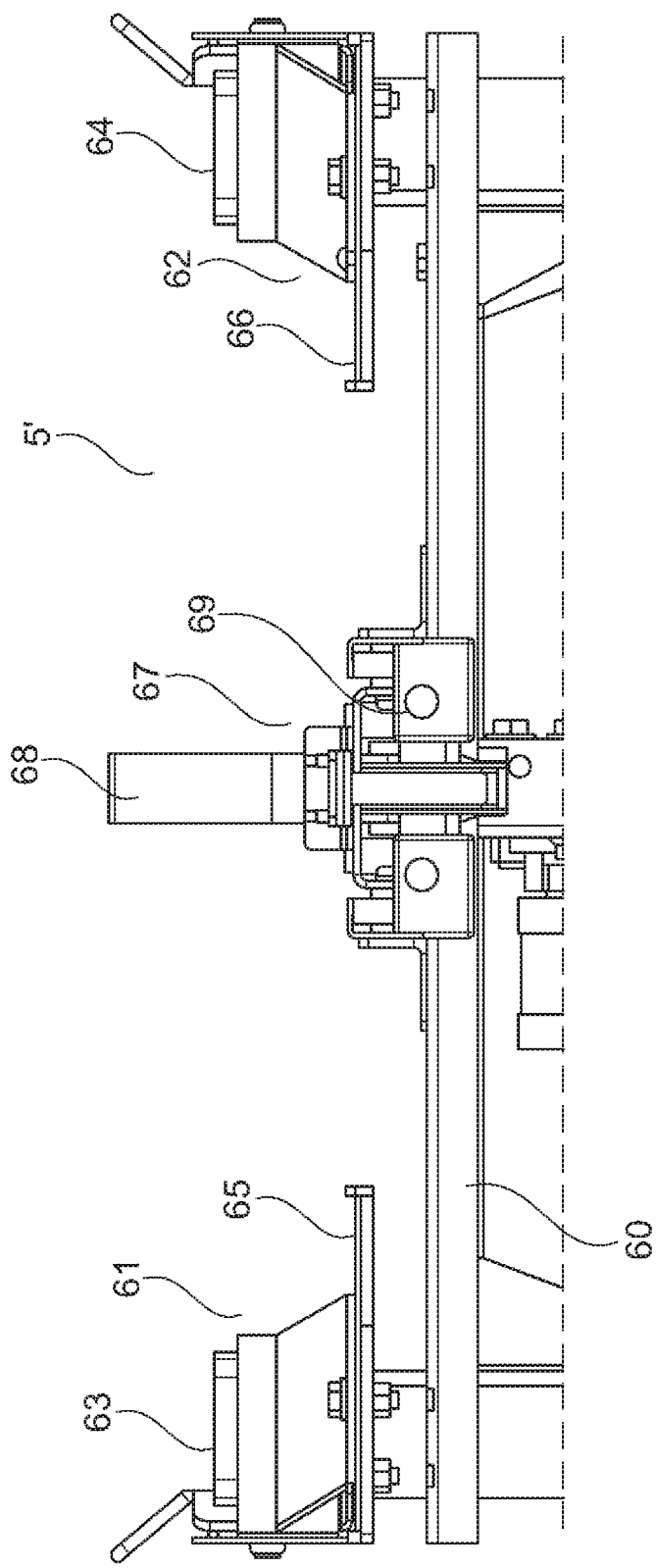
FIG. 10 A side view in the direction of the transport direction of a second embodiment of a gravity conveyor.

FIGS. 10 to 15 show a second embodiment of a gravity conveyor 5', in which the roller conveyor is replaced by a driving track having driving surfaces 65, 66 for transporting the roller container 28. FIG. 10 shows a side view of a corresponding gravity conveyor 5', looking in the direction of transport, whereby two rail arrangements 61, 62 are disposed on a base carrier 60, said arrangements comprising roller conveyors 63, 64 on one hand and the driving surfaces 65, 66 on the other. The EU standard pallets can be conveyed on the roller conveyors 63, 64 while the roller containers 28 can travel on their wheels 29 on the driving surfaces 65, 66. In order to ensure that the goods units 9, 10 deposited on the gravity conveyor 5' actually move along the inclined track, a pusher-dog carriage 67 is provided which can be moved along the transport direction of the gravity conveyor 5', both in the transport direction and in the direction opposite to the transport direction.

The pusher-dog carriage 67 has a transport car or carriage 69, which is movably disposed on the frame 60. For example, the car or carriage 69 can slide along a rail arrangement or be movably mounted on rollers. Also conceivable is an arrangement on a conveyor chain and the like. The transport of the pusher-dog carriage 67 can be realized by various drive means, such as conveyor chains, electric motors and the like.

Figure 11:
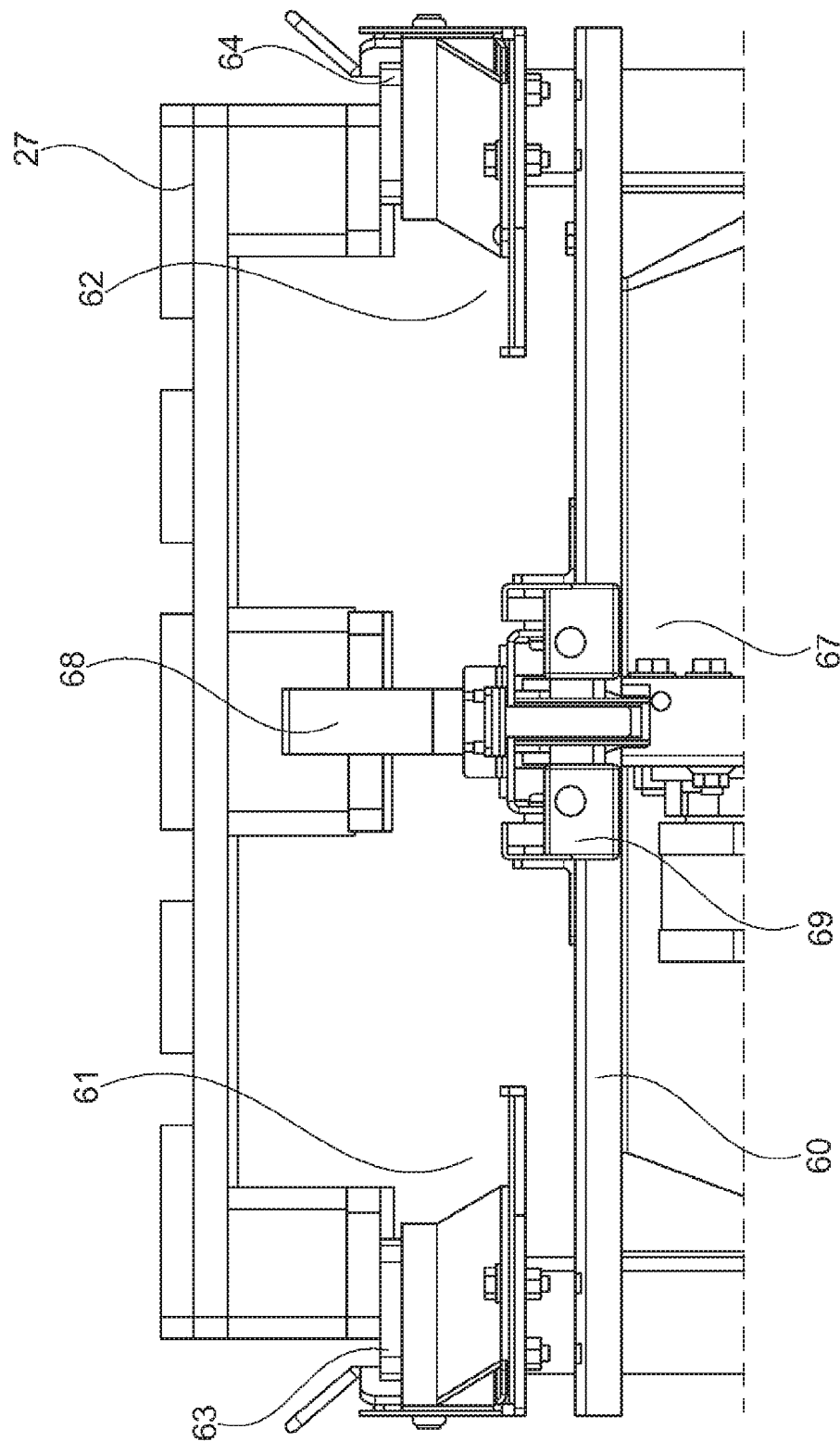
FIG. 11 A side view according to FIG. 10 during operation with a pallet.
Figure 12:
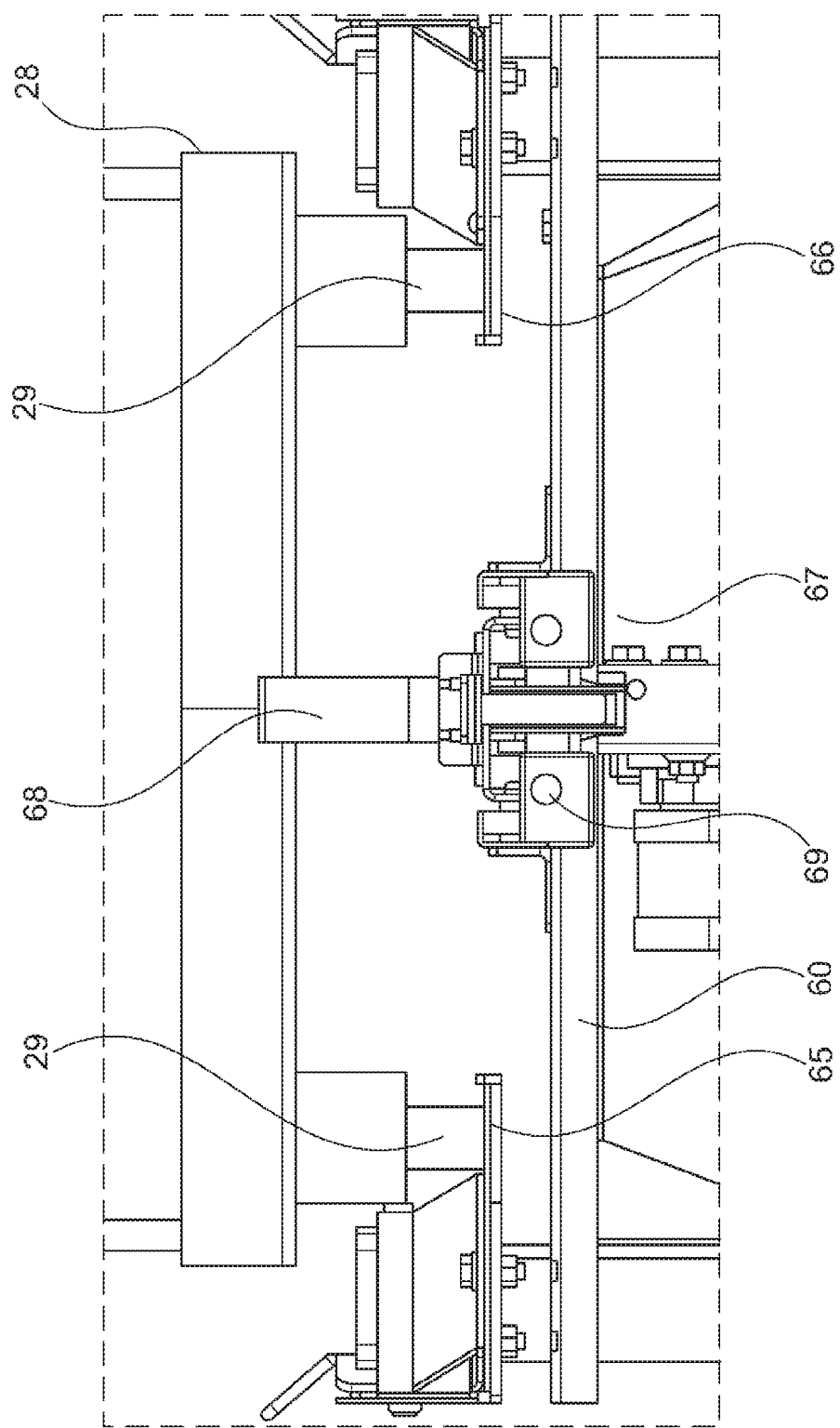
FIG. 12 A side view of the gravity conveyor according to FIG. 10 in operation with a roller container; and in FIGS. 13 to 15 Side views of the gravity conveyor from FIGS. 10 to 12 to illustrate the mode of operation of the pusher-dog carriage.

Disposed on the car or carriage 69 is a folding dog 68, which is pretensioned by a spring device into the unfolded position, as shown in FIGS. 10 to 12. The dog 68 can be folded into the car or carriage 69 in a direction matching the transport direction on the gravity conveyor 5', but folding in the other direction is not possible. Accordingly, the dog 68 can push in the unfolded position if it is resting against an EU standard pallet 27 or a roller container 28. This is shown in FIGS. 11 and 12 which show the gravity conveyor 5' in operation with an EU standard pallet (FIG. 11) and a roller container 28 (FIG. 12).

The operating principle of the pusher-dog carriage 67 with the folding dog 68 is shown in FIGS. 13 to 15. In FIG. 13, several goods units 9, 10 have already reached the end of the gravity conveyor line 5', while one goods unit 10 is still disposed at the start of the gravity conveyor 5'. In order for the goods unit 10 to also be conveyed in the transport direction should the gradient of the gravity conveyor prove insufficient for independent transport, the pusher-dog carriage 67 is moved in the direction of the start of the gravity conveyor 5', whereby it folds down under the goods units 9, 10 already at the end of the gravity conveyor 5'. This is shown in FIG. 13. Upon reaching the start of the gravity conveyor 5', the folding dog 68 is unfolded under the spring pretension and can rest against the roller container or the goods unit 10. Through the movement of the pusher-dog carriage 67 in the direction of the end of the gravity conveyor 5', the goods unit 10 is pushed and also moved in the direction of the end of the gravity conveyor 5'. Thus it can be ensured that all goods units 9, 10 are disposed in sequence without any gaps at the end of the gravity conveyor 5'.

Although the present invention has been described in detail with reference to the embodiments, it is self-evident to the person skilled in the art that the invention is not limited to these embodiments, but rather that modifications involving the omission of individual characteristics are possible, or that other types of combinations of characteristics can be made without departing from the scope of the appended claims. In particular, the present disclosure comprises all combinations of the presented individual characteristics.

The invention claimed is:

1. A shipping buffer of an order-picking system in which goods are picked into goods units, comprising at least one storage area in which fully picked goods units are stored before the good units leave the order-picking system, wherein the shipping buffer further comprises at least one staging area and at least one automated operating device comprising a stacker crane, wherein in the staging area fully picked goods units retrieved from the storage area can be automatically staged by the operating device in accordance with a predefined order for their impending removal, wherein the stacker crane is configured for storing and retrieving goods units comprising a plurality of goods which are mounted on different carriers and can move two-dimensionally in a movement plane parallel to a rack and comprises at least one lifting unit transverse to the movement plane for lifting and carrying the different carriers, wherein the lifting unit is adjustably configured for adapting to the different carriers and has two prongs which can be extended in an extension direction transverse to the movement direction of the stacker crane and a distance between which transverse to the extension direction can be adjusted, and wherein the stacker crane is configured and adjustable such that the stacker crane can carry Euro pallets and roller containers and other carrier pallets and, to an extent depending on the setting, can carry at least two roller containers.

2. The shipping buffer in accordance with claim 1, wherein the storage area comprises a pallet racking warehouse and/or the staging area comprises a gravity conveyor.

3. The shipping buffer in accordance with claim 2, wherein the pallet racking warehouse comprise two racks, each one of which comprises a plurality of rack locations which are disposed side by side and above one another, in which the picked goods units can be stored, and comprises a stacker crane which can be moved in a plane between the racks, wherein one end of a gravity conveyor is disposed in at least one area of a rack location and/or the pallet racking warehouse comprises an air-conditioning housing in order that the rack locations may be operated at a different temperature from the ambient temperature and/or at different temperatures from each other.

4. The shipping buffer in accordance with claim 3, wherein one or more air flows can be adjusted in an air-conditioning housing.

5. The shipping buffer in accordance with claim 2, wherein the pallet racking warehouse comprises air-conditioning devices and/or the pallet racking warehouse comprises different climate zones, which are disposed with the temperature rising from bottom to top.

6. The shipping buffer in accordance with claim 1, wherein the operating device is disposed in relation to the storage area and the staging area such that goods units can be transferred by the operating device in an automated manner from the storage area into the staging area.

7. The shipping buffer in accordance with claim 1, wherein each of the prongs has a width which extends transversely to the extension direction and is dimensioned such that one of the carriers can at least be securely held.

8. An order-picking system with the shipping buffer in accordance with claim 1.

9. A shipping buffer of an order-picking system in which goods are picked into goods units, comprising at least one storage area in which fully picked goods units are stored before the good units leave the order-picking system, wherein the shipping buffer further comprises at least one staging area comprising a gravity conveyor and further comprises at least one automated operating device, wherein in the staging area fully picked goods units retrieved from the storage area can be automatically staged by the operating device in accordance with a predefined order for their impending removal, and wherein the gravity conveyor comprises a transport track, which is inclined to the horizontal and comprises transport means, such that carriers which can be arranged on the transport track are moved at least partially under the force of gravity, wherein the transport track is configured such that at least first self-propelled carriers with wheels on undersides thereof and at least second non-self-propelled carriers with contact surfaces on undersides thereof can be conveyed simultaneously on the gravity conveyor, wherein the underside of the carriers is oriented towards the transport track, and wherein the gravity conveyor comprises at least one motor-driven pushing element, which can be moved along the transport track, such that additionally at least one type of carrier can be pushed on the transport track.

10. The shipping buffer in accordance with claim 9, wherein the pushing element is movable in the transport direction and the direction opposite thereto, wherein the pushing element is configured such that the pushing element has a pushing function in the transport direction only and no pushing function in the opposite direction and can be moved past carriers located on the transport track and is foldable in the transport direction.

11. The shipping buffer in accordance with claim 9, wherein the transport track, through the carriers, comprises self-propellable transport means.

12. The shipping buffer in accordance with claim 9, wherein the transport track comprises at least one element selected from the group comprising endless belts, rollers, wheels, driving tracks and sliding elements, wherein some of the endless belts, rollers and/or wheels are mounted so as to freely rotate, and/or the transport track comprises at least one transport level which forms at least one part of the surface of the transport track on which the carriers are mounted.

13. The shipping buffer in accordance with claim 9, wherein the transport track comprises at least three transport areas which extend parallel with each other along the transport direction of the transport track, wherein every transport area comprises transport means, wherein one or more transport areas are combined into groups, wherein each group is configured for one or more types of carriers.

14. The shipping buffer in accordance with claim 13, wherein the transport areas have at least in part different transport levels, which are offset against each other, and/or the transport areas are separated from each other by one or more recesses that extend parallel with the transport areas along the transport direction of the transport track.

15. The shipping buffer in accordance with claim 14, wherein the recesses along the transport direction continuously define along the entire length of the transport track a predetermined free space between adjacent transport areas, such that wheels of the carriers can be moved contactlessly in the recesses and/or the pushing elements can be movably accommodated.

16. The shipping buffer in accordance with claim 13, wherein two transport areas forming a first group are provided, which by way of transport means comprise rollers which are disposed in two parallel roller conveyors, and that two further transport areas forming a second group are provided, which by way of transport means comprise driving tracks which are disposed as two parallel driving tracks.

17. The shipping buffer in accordance with claim 9, wherein at the end of the conveyor at least one braking device is provided for braking the carriers and/or at the end of the conveyor at least one identification device for identifying the carriers is disposed, wherein the braking device and identification device are configured so as to cooperate such that the braking device is selected or activated as a function of identification of the carrier.

18. An order-picking system with the shipping buffer in accordance with claim 9.

19. A method for issuing picked goods units from an order-picking system in which various goods are composed into goods units, comprising the following steps:
   providing a shipping buffer comprising at least one storage area in which fully picked goods units are stored before the good units leave the order-picking system, and at least one staging area and at least one automated operating device, wherein in the staging area fully picked goods units retrieved from the storage area can be automatically staged by the operating device in accordance with a predefined order for their impending removal,
   feeding at least a portion of the picked goods units into the shipping buffer,
   storing at least a portion of the goods units fed to the shipping buffer in a storage area of the shipping buffer,
   retrieving a sequence of goods units from the storage area into a staging area of the shipping buffer and storing the goods units in the corresponding sequence, and
   issuing the goods units from the staging area in the order defined by the sequence;
storage and retrieval of the goods units into the storage area being automated.

20. The method in accordance with claim 19, wherein the issuing of the goods units from the staging area proceeds stepwise by removing individual goods units from a hand-over position, wherein further goods units to be issued are automatically and necessarily fed into the hand-over position.

* * * * *